(12) United States Patent
Sakai (10) Patent No.: US 8,243,926 B2
(45) Date of Patent: Aug. 14, 2012

(54) TRANSPORT STREAM ENCRYPTION DEVICE AND ITS EDITING DEVICE AND METHOD FOR USE THEREIN

(75) Inventor: Yuichi Sakai, Tokyo (JP)

(73) Assignee: NEC Personal Computers, Ltd., Tokyo (JP)

( * ) Notice: Subject to any disclaimer, the term of this patent is extended or adjusted under 35 U.S.C. 154(b) by 1074 days.

(21) Appl. No.: 10/952,738

(22) Filed: Sep. 30, 2004

(65) Prior Publication Data

US 2005/0069132 A1    Mar. 31, 2005

(30) Foreign Application Priority Data

Sep. 30, 2003    (JP) .................................. 2003-340338

(51) Int. Cl.
*H04N 7/167*    (2011.01)
(52) U.S. Cl. ........................... 380/239; 380/43; 713/160
(58) Field of Classification Search .................. 713/160; 380/43
See application file for complete search history.

(56) References Cited

U.S. PATENT DOCUMENTS

| | | | | |
|---|---|---|---|---|
| 5,799,083 | A | * | 8/1998 | Brothers et al. ............... 380/239 |
| 6,028,932 | A | * | 2/2000 | Park .............................. 380/203 |
| 6,070,245 | A | * | 5/2000 | Murphy et al. .................... 726/3 |
| 6,324,217 | B1 | * | 11/2001 | Gordon ..................... 375/240.28 |
| 6,421,308 | B1 | * | 7/2002 | Kizu et al. ..................... 369/53.17 |
| 6,971,022 | B1 | * | 11/2005 | Katta et al. ..................... 713/193 |
| RE39,319 | E | * | 10/2006 | Park .............................. 380/201 |
| 7,120,251 | B1 | * | 10/2006 | Kawada et al. ................ 380/201 |
| 7,151,832 | B1 | * | 12/2006 | Fetkovich et al. ............. 380/210 |
| 7,190,723 | B2 | * | 3/2007 | Schoenblum ............. 375/240.05 |
| 7,231,516 | B1 | * | 6/2007 | Sparrell et al. ................. 713/156 |
| 7,295,610 | B2 | * | 11/2007 | Schoenblum ............. 375/240.03 |
| 7,349,959 | B2 | * | 3/2008 | Imamura et al. ............... 709/223 |
| 7,356,147 | B2 | * | 4/2008 | Foster et al. ................... 380/281 |
| 2003/0204660 | A1 | * | 10/2003 | Saito et al. ..................... 710/305 |
| 2004/0034787 | A1 | * | 2/2004 | Kitani .............................. 713/189 |

(Continued)

FOREIGN PATENT DOCUMENTS

JP    5-095352    4/1993

(Continued)

OTHER PUBLICATIONS

Japanese Patent Office issued a Japanese Office Action dated Oct. 24, 2008, Application No. 2003-340338.

*Primary Examiner* — William Powers
*Assistant Examiner* — Yonas Bayou
(74) *Attorney, Agent, or Firm* — Young & Thompson (57) ABSTRACT

An encryption device, comprising: detection portion for detecting a TS header, a PES header, a sequence header, a GOP header, and a sequence end code for a transport stream not encrypted; and encryption portion for encrypting the transport stream except the TS header, the PES header, the sequence header, the GOP header, and the sequence end code. An editing device, comprising: detection portion for detecting a TS header, a PES header, a sequence header, a GOP header, and a sequence end code in a transport stream; and editing portion for editing the encrypted transport stream without decryption in units of TS packets ranging from a TS packet where the GOP header is detected to a TS packet previous to a TS packet where a subsequent GOP header is detected out of TS packets having an identical PID.

6 Claims, 5 Drawing Sheets

U.S. PATENT DOCUMENTS

| | | | |
|---|---|---|---|
| 2005/0036515 A1* | 2/2005 | Cheung et al. | 370/487 |
| 2005/0069132 A1* | 3/2005 | Sakai | 380/239 |
| 2006/0291653 A1* | 12/2006 | Kawada et al. | 380/201 |
| 2007/0110236 A1* | 5/2007 | Tada | 380/201 |

FOREIGN PATENT DOCUMENTS

| | | |
|---|---|---|
| JP | 7-111645 | 4/1995 |
| JP | 7-140896 | 6/1995 |
| JP | 08-322034 | 12/1996 |
| JP | 10-336624 | 12/1998 |
| JP | 11-220655 | 8/1999 |
| JP | 2000-502219 | 2/2000 |
| JP | 2000-235780 | 8/2000 |
| JP | 2000-236496 | 8/2000 |
| JP | 2001-103444 | 4/2001 |
| JP | 2001-249695 | 9/2001 |
| JP | 2001-251599 | 9/2001 |
| JP | 2001-358708 | 12/2001 |
| JP | 2001-527350 | 12/2001 |
| JP | 2002-217894 | 8/2002 |
| JP | 2002-287624 | 10/2002 |
| JP | 2002-287625 | 10/2002 |
| JP | 2002-290999 | 10/2002 |
| JP | 2003-006999 | 1/2003 |
| JP | 2003-007000 | 1/2003 |
| JP | 2003-134106 | 5/2003 |
| JP | 2003-141816 | 5/2003 |
| JP | 2003-319322 | 7/2003 |
| JP | 2003-264773 | 9/2003 |
| JP | 2003-264804 | 9/2003 |
| WO | WO 97/18654 | 5/1997 |
| WO | WO 99/33271 | 7/1999 |

* cited by examiner

TRANSPORT STREAM ENCRYPTION DEVICE AND ITS EDITING DEVICE AND METHOD FOR USE THEREIN

BACKGROUND OF THE INVENTION

1. Field of the Invention

The present invention relates to an encryption device and editing device for a transport stream including moving picture experts group (MPEG) signal and a method for use therein.

2. Description of the Related Art

Recently, with the advance of digital signal processing technology, video signals are getting transmitted and stored in a form of digital signals. For transmitting and storing digital signals, an MPEG system is standardized.

Figure 1:
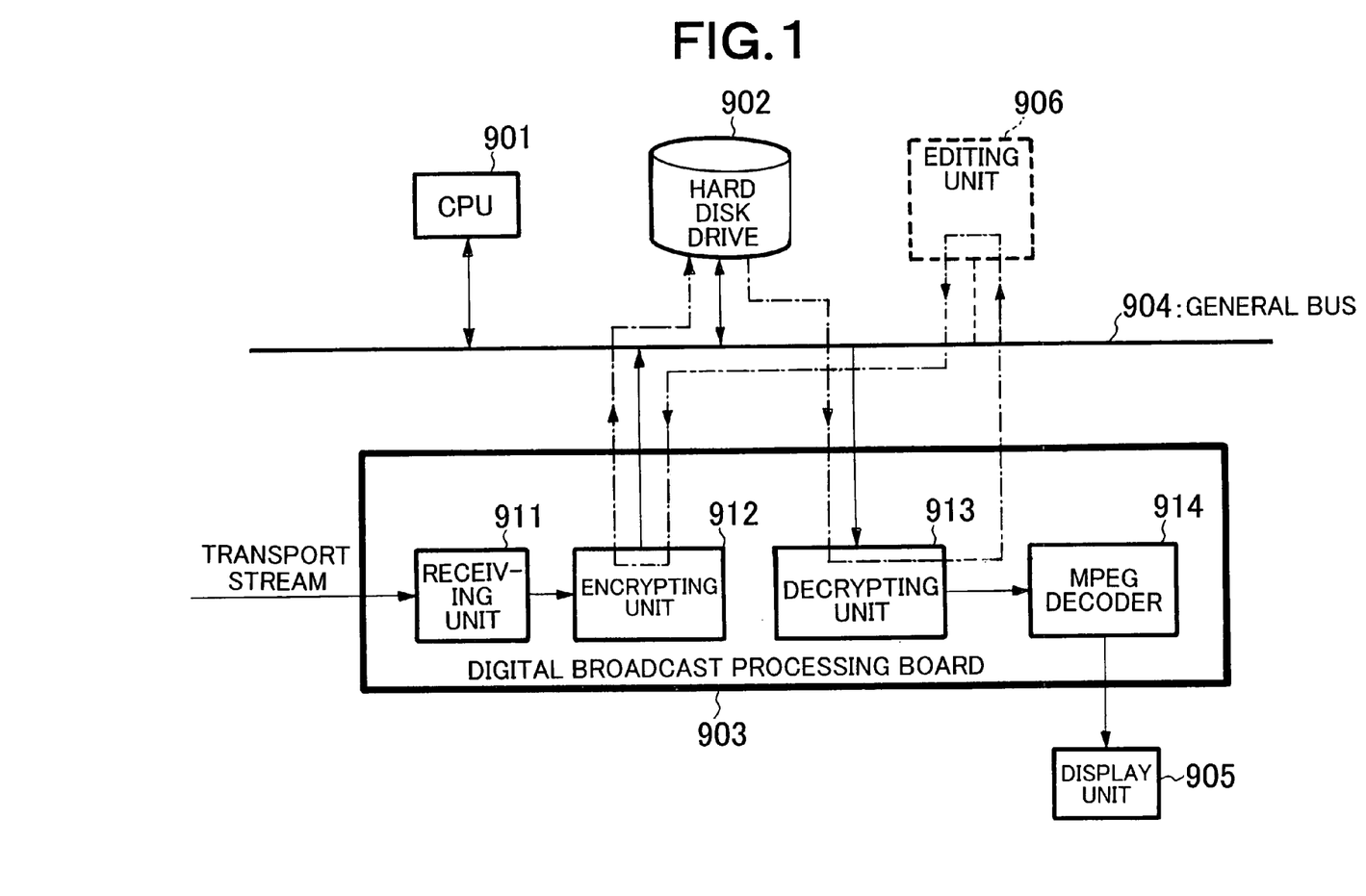
FIG. 1 is a block diagram showing a configuration of a processing system for MPEG signals on a personal computer basis according to a conventional example.

FIG. 1 illustrates a conventional example of a processing system for MPEG signals on a personal computer basis.

Referring to FIG. 1, this system comprises a CPU 901, a hard disk drive 902, a digital broadcast processing board 903, a general bus 904, and a display unit 905.

The CPU 901 performs various kinds of arithmetic processing according to a program. The hard disk drive 902 stores various programs and data and particularly stores an encrypted transport stream. The digital broadcast processing board 903 performs various kinds of processing of a transport stream received from a digital broadcasting service. The general bus 904 is connected to the CPU 901, the hard disk drive 902, and the digital broadcast processing board 903, so that it transmits data to be input or output between them. The display unit 905 displays various screens, inputs video signals particularly output from the digital broadcast processing board 903, and displays a video according to the video signals.

The digital broadcast processing board 903 comprises a receiving unit 911, an encrypting unit 912, a decrypting unit 913, and an MPEG decoder 914.

The receiving unit 911 receives a transport stream from a broadcasting service. The encrypting unit 912 encrypts the transport stream received by the receiving unit 911 and outputs the encrypted transport stream to the general bus 904. The hard disk drive 902 stores the encrypted transport stream. The hard disk drive 902 outputs the encrypted transport stream stored therein. The decrypting unit 913 decrypts the encrypted transport stream and outputs an MPEG bit stream generated by demultiplexing video parts from the decrypted transport stream to the MPEG decoder 914.

The MPEG decoder 914 decodes the MPEG bit stream and outputs video signals obtained thereby to the display unit 905.

According to this arrangement, the transport stream appearing on the general bus 904 has already been encrypted. Therefore, it is impossible to copy the transport stream that has appeared on the general bus 904 illegally. In addition, the video signals output from the MPEG decoder 914 are directly output to the display unit 905, and therefore it cannot be intercepted. Thus, the copyright can be protected.

The prior art documents related to the present invention are as follows:

Japanese Laid-Open Patent Publication (Kokai) No. Hei 08(1996)-322034
Japanese Laid-Open Patent Publication (Kokai) No. Hei 10(1998)-336624
Japanese Laid-Open Patent Publication (Kokai) No. 2002-287624
Japanese Laid-Open Patent Publication (Kokai) No. 2002-287625
Japanese Laid-Open Patent Publication (Kokai) No. 2002-290999.

If the system as shown in FIG. 1 is used, however, a transport stream is encrypted completely by the encrypting unit 912, and therefore we cannot know what and where video pictures exist in the transport stream unless it is decrypted using the decrypting unit 913. Therefore, its content cannot be edited unless it is decrypted using the decrypting unit 913.

More specifically, if it is assumed that the transport stream decrypted by the decrypting unit 913 is edited by the editing unit 906 indicated by a dashed line in FIG. 1, data read from the hard disk drive 902 is decrypted by the decrypting unit 913, processed by the editing unit 906, encrypted by the encrypting unit 912, and then rewritten into the hard disk drive 902. Therefore, the decrypted transport stream appears on the general bus 904 as indicated by a dotted arrow line in FIG. 1. Thereby, the copyright cannot be protected.

Otherwise, there can be a situation that the encrypting unit 912 obtains representative images of GOPs from the transport stream not encrypted yet and edits the transport stream while viewing the representative images. However, even though a user desires to include the GOPs into the transport stream after editing, it is unknown where the GOPs exist in the transport stream. To clarify it, the encrypted transport stream eventually need be decrypted. Therefore, the copyright cannot be protected.

SUMMARY OF THE INVENTION

Therefore, it is an object of the present invention to provide an encryption device and editing device for a transport stream which enable editing content while protecting the copyright of the content, and a method therefor.

According to a first aspect of the present invention, there is provided a stream encryption device, comprising: detection means for detecting at least a header of a unit of editing and a necessary part for detecting the header from an input stream; and encryption means for encrypting the input stream except at least the header and the necessary part for detecting the header.

According to a second aspect of the present invention, there is provided a stream editing device, comprising: detection means for detecting a necessary part for detecting a header and the header from a stream encrypted by the stream encryption device according to the first aspect of the present invention; and editing means for editing the stream in units of editing with the stream remaining encrypted.

According to a third aspect of the present invention, there is provided a transport stream encryption device, comprising: detection means for detecting at least a TS header, a PES header of a PES packet existing in a payload of a TS packet, and a GOP header existing in a payload of a video PES packet from a transport stream not encrypted; and encryption means for encrypting the transport stream except at least the detected TS header, PES header, and GOP header.

In the transport stream encryption device according to the third aspect of the invention, the detection means may further detect a sequence header and a sequence end code existing in the payload of the video PES packet and the encryption means may encrypt the transport stream except at least the detected sequence header and sequence end code as well as the detected TS header, PES header, and GOP header.

In the above encryption device, the encryption means may encrypt TS packets including different GOPs with different encryption keys.

The above encryption device may further comprise moving picture restoration means for restoring moving picture from the transport stream not encrypted or the encrypted transport stream; and representative image generation means for generating representative images corresponding to all or a part of GOPs respectively on the basis of the restored moving picture.

According to a fourth aspect of the present invention, there is shown a transport stream editing device, comprising: detection means for detecting a TS header, a PES header of a PES packet existing in a payload of a TS packet, and a GOP header existing in a payload of a video PES packet from a transport stream encrypted by the transport stream encryption device according to the third aspect of the invention; and editing means for editing the encrypted transport stream without decryption in units of TS packets ranging from a TS packet where the GOP header is detected to a TS packet previous to a TS packet where a subsequent GOP header is detected out of TS packets having an identical PID.

According to a fifth aspect of the present invention, there is provided a transport stream editing device, comprising: detection means for detecting a TS header, a PES header of a PES packet existing in a payload of a TS packet, and a GOP header existing in a payload of a video PES packet from a transport stream encrypted by the transport stream encryption device according to the third aspect of the invention; and editing means for editing the encrypted transport stream without decryption in such a way as to include a GOP selected by a user with reference to representative images in units of TS packets ranging from a TS packet where the GOP header is detected to a TS packet previous to a TS packet where a subsequent GOP header is detected out of TS packets having an identical PID.

In the transport stream editing device according to the fourth or fifth aspect of the invention, the detection means may further detect a sequence header and a sequence end code existing in the payload of the video PES packet.

According to the first and second aspects of the invention, the stream can be edited in units of editing without decryption of the encrypted stream, by which a copyright of a content can be protected.

According to the third aspect of the invention having the above preferable features, the transport stream is encrypted except the TS header, the PES header, the sequence header, the GOP header, and the sequence end code, by which the TS header, the PES header, and the GOP header can be detected without decryption and therefore a content can be edited with a copyright of the content protected.

According to the third aspect of the invention having the above different preferable feature, the TS packets including different GOPs are encrypted with different encryption keys, by which the copyright of the content can be protected more sufficiently.

According to the third aspect of the invention having the above still different preferable features, moving pictures are restored and representative images are generated on the basis of the restored moving pictures in such a way that the representative images correspond to all or a part of GOPs respectively, by which a simplified user interface can be provided for editing.

According to the fourth aspect of the invention, editing is performed without decryption, by which a content can be edited with a copyright of the content protected.

According to the fifth aspect of the invention, editing is performed without decryption, by which a content can be edited with a copyright of the content protected; and editing is performed in such a way as to include the GOP selected by the user with reference to the representative images, by which a simplified user interface can be provided.

DETAILED DESCRIPTION OF THE PREFERRED EMBODIMENTS

The preferred embodiments of the present invention will now be described in detail hereinafter with reference to the accompanying drawings.

Figure 2:
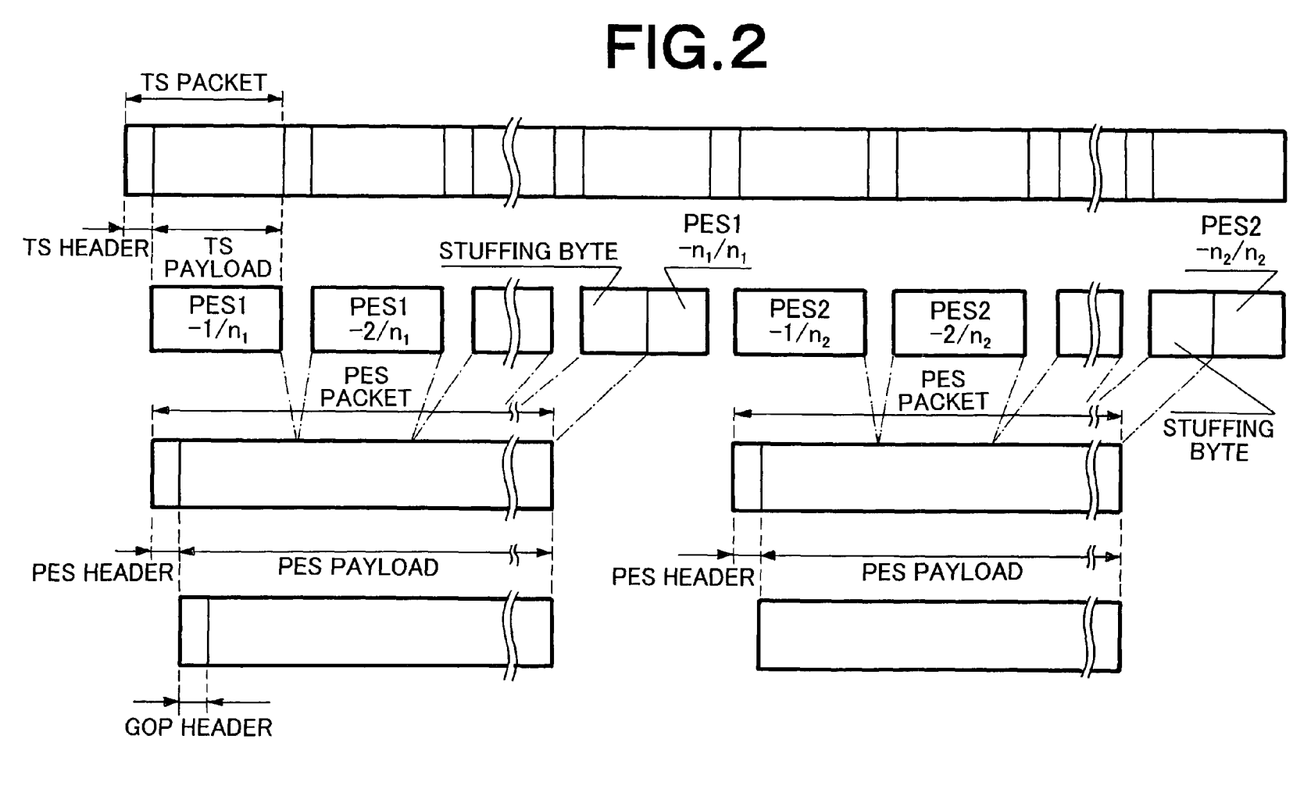
FIG. 2 is a format diagram of a TS packet.

FIG. 2 illustrates a format diagram of a transport stream. Referring to FIG. 2, the transport stream comprises a plurality of transport stream (TS) packets. Each TS packet is of a fixed length and comprises a TS header and a TS payload. A packetized elementary stream (PES) packet described later is generally of a variable length and is longer than the TS packet. Therefore, a single PES packet is divided into segments and they are inserted into payloads of a plurality of TS packets, respectively. When a new PES packet starts, a new TS packet is used. Therefore, a PES header is always present at the beginning of a TS payload. If the last segment of a PES packet is shorter than the payload of the TS packet, a stuffing byte is inserted into a portion previous to the last segment of the PES packet so as to keep the length of the TS packet. Each PES packet comprises a PES header and a PES payload. Elementary stream segments are inserted into the PES payloads. Particularly, PES packets created from a video elementary stream are referred to as video PES packets.

Figure 3:
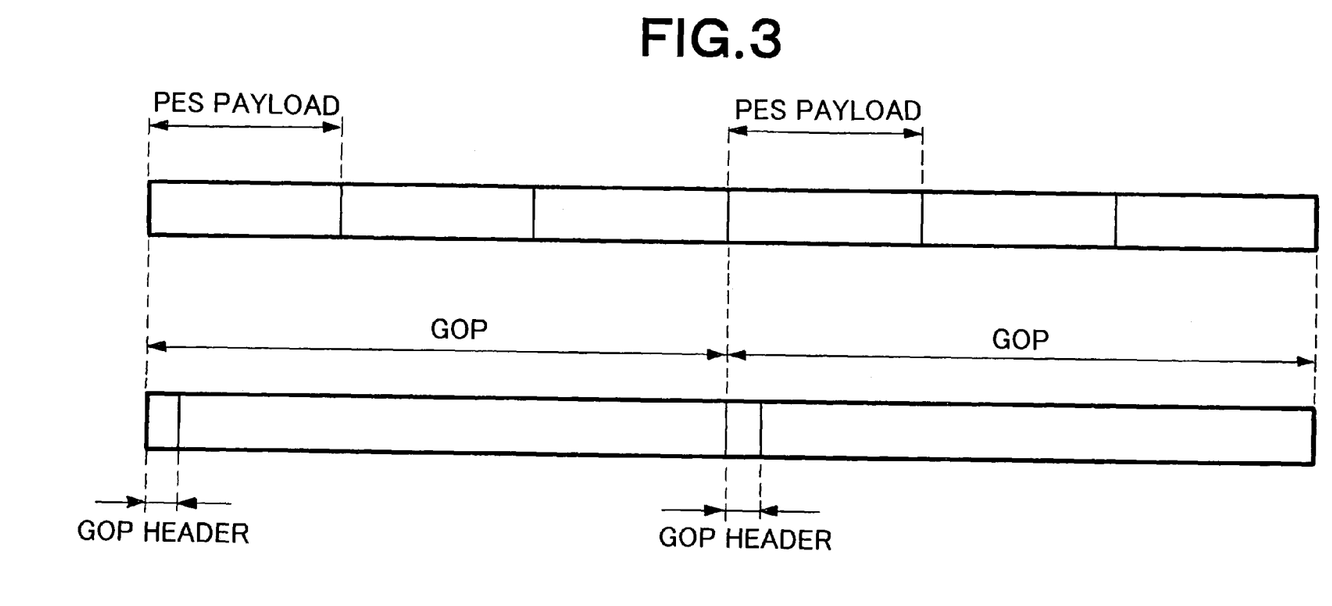
FIG. 3 is a diagram showing a relation between a GOP and a PES packet.

FIG. 3 illustrates a group of pictures (GOP) and a payload of the video PES packet. At the beginning of a GOP, a GOP header is arranged. While it is arbitrary how the video elementary stream is segmented to create the video PES packets, the coincidence between a head of the PES packet and a head of the GOP simplifies decoding processing. In this embodiment, it is assumed that the head of the PES packet coincide with the head of the GOP as shown in FIG. 3. The number of pictures included in a single PES packet is arbitrary: for example, a single picture is included in a single PES packet.

The TS header includes a PID and the like. The PID of TS packets created from the same PES packet is identical. The PES header includes a stream ID, a PES packet length, a presentation time stamp (PTS), a decoding time stamp (DTS) and the like. A single elementary stream is transmitted by PES packets having an identical stream ID. Stream IDs of values ranging from 0xE0 to 0xFE are allocated to video signals. Therefore, it is possible to know which TS packet includes video signals and in what system the video signals in the TS packet are included, by checking the PID included in the TS header and the stream ID included in the PES header. Therefore, it is possible to extract only video signals of a system focused on by checking the PID included in the TS header and the stream ID included in the PES header.

The GOP header includes a group start code, a time code (time, minute, second, picture), a closed GOP, and a broken link.

Editing is performed with reference to time codes included in GOP headers respectively. Therefore, it is necessary to detect the time codes included in GOPs for editing. To detect the GOP headers from a transport stream, TS packets are recognized by detecting TS headers from the transport stream, first. PES packets are then recognized by detecting PES headers inserted at the beginning of the payloads of a part of the recognized TS packets. Thereafter, a video elementary stream is reconstructed by connecting video PES packets to each other out of the recognized PES packets and the GOPs are then reconstructed from the reconstructed video elementary stream. If the GOP headers are detected in this method, it is possible to know which TS packets include the GOP headers. In addition, only the video signals of the system focused on can be extracted as stated above. Therefore, it is possible to extract TS packets including a portion ranging from a time code to another time code in the video signals of the system focused on. The extracted TS packets are then connected to each other, and thereafter an adjustment is made to a program clock reference (PCR) included in an adaptation field optionally inserted between the TS header and the PES packet and to PTS and DTS included in the PES header, thereby completing the editing.

Figure 4:
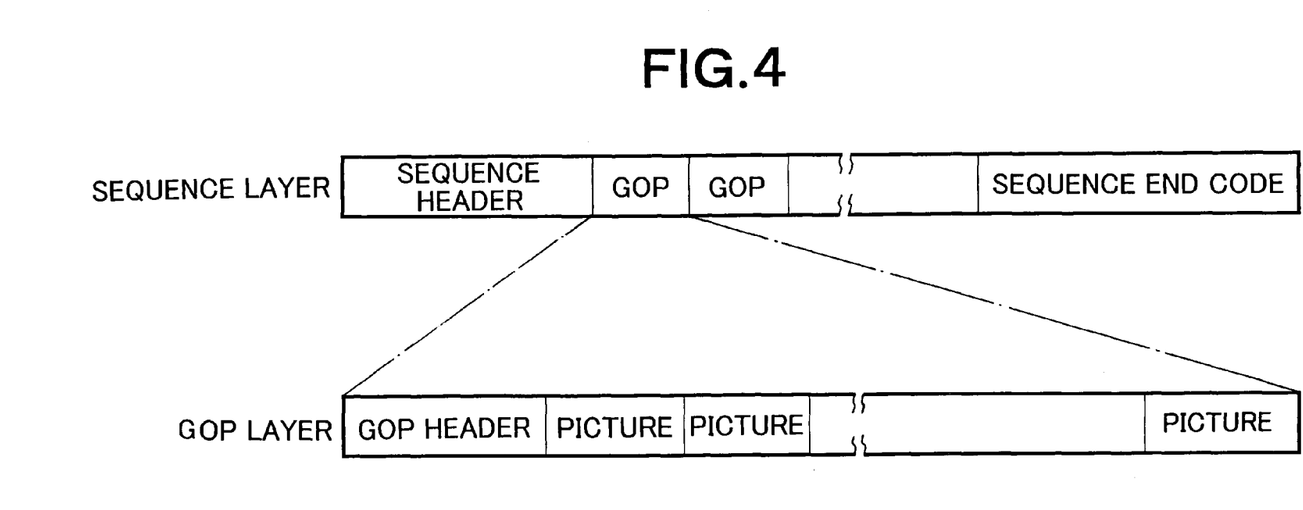
FIG. 4 is a diagram showing a relation between a sequence layer and a GOP layer.

Additionally, at least one GOP, a sequence header, and a sequence end code form a sequence layer as shown in FIG. 4. The sequence header includes a sequence header code, lengthwise and crosswise dimensions of a screen, an aspect ratio of the screen, an image rate, a bit rate, a VBV buffer size, and a quantization matrix. The information included in the sequence header need be directly inherited to the TS stream after editing. Therefore, it is necessary to recognize the sequence layer even in a case where the editing is performed in units of GOP.

Accordingly, in this embodiment, the TS header, the PES header, the sequence header, the GOP header, and the sequence end code are not encrypted, but only the other parts in the transport stream are encrypted in order to enable the editing with the content remaining encrypted.

Figure 5:
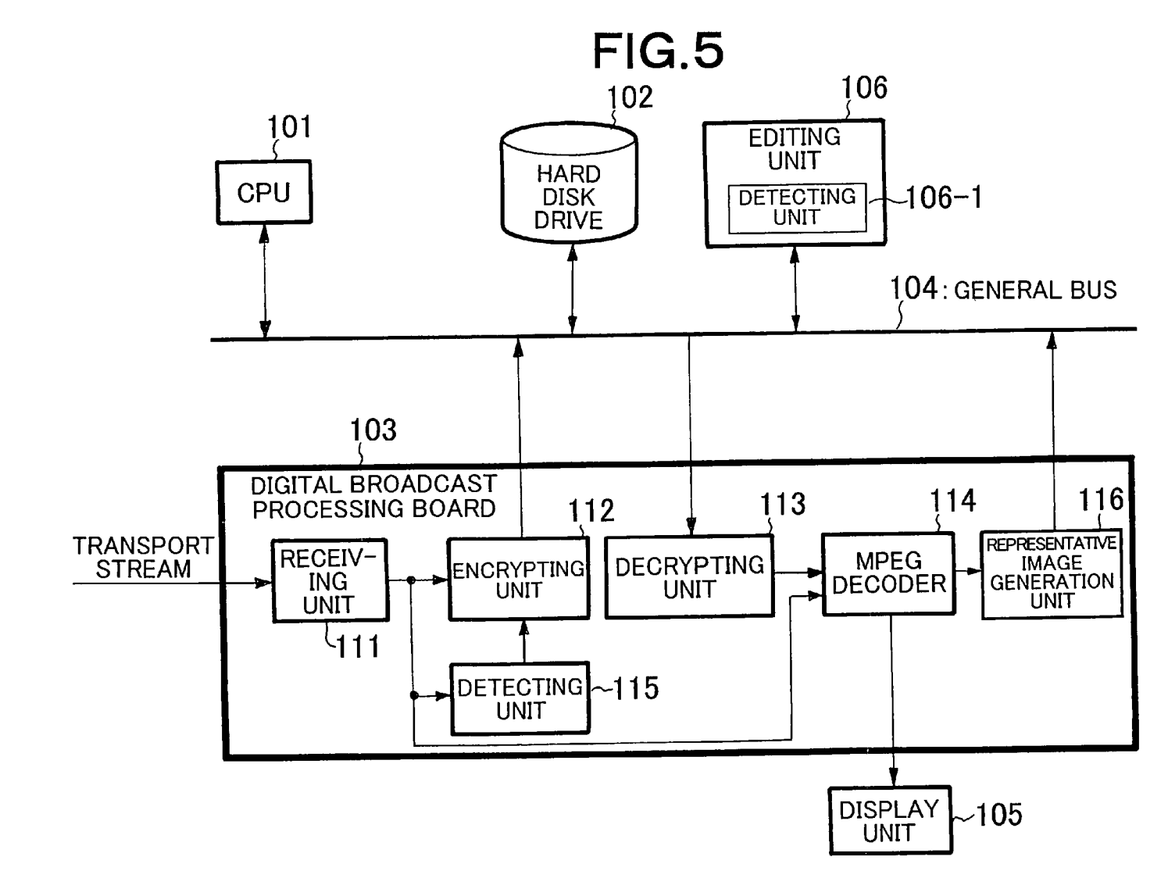
FIG. 5 is a block diagram showing a configuration of a processing system for MPEG signals on a personal computer basis according to an embodiment of the present invention.

FIG. 5 illustrates a processing system for MPEG signals on a personal computer basis according to the embodiment of the present invention.

Referring to FIG. 5, the system comprises a CPU 101, a hard disk drive 102, a digital broadcast processing board 103, a general bus 104, a display unit 105, and an editing unit 106.

The CPU 101 performs various kinds of arithmetic processing according to a program. The hard disk drive 102 stores various programs and data, and particularly stores an encrypted transport stream. The digital broadcast processing board 103 performs various kinds of processing of a transport stream received from a digital broadcasting service. The general bus 104 is connected to the CPU 101, the hard disk drive 102, the digital broadcast processing board 103, and the editing unit 106, so that it transmits data to be input or output between them. The display unit 105 displays various screens and particularly displays a video according to video signals input from the digital broadcast processing board 103.

The digital broadcast processing board 103 comprises a receiving unit 111, an encrypting unit 112, a decrypting unit 113, an MPEG decoder 114, a detecting unit 115, and a representative image generation unit 116.

The receiving unit 111 receives a transport stream from a broadcasting service. The detecting unit 115 detects a TS header, a PES header, a sequence header, a GOP header, and a sequence end code from the transport stream received by the receiving unit 111. The encrypting unit 112 encrypts the transport stream received by the receiving unit 111 except the TS header, the PES header, the sequence header, the GOP header, and the sequence end code and then outputs the partially encrypted transport stream to the general bus 104. The hard disk drive 102 stores the partially encrypted transport stream. The hard disk drive 102 outputs the partially encrypted transport stream stored therein. The decrypting unit 113 decrypts the partially encrypted transport stream and outputs an MPEG bit stream generated by demultiplexing video parts from the decrypted transport stream to the MPEG decoder 114. The MPEG decoder 114 decodes the MPEG bit stream and outputs video signals obtained thereby to the display unit 105.

The editing unit 106 has a detecting unit 106-1. The detecting unit 115 detects the TS header, the PES header, the sequence header, the GOP header, and the sequence end code from the transport stream which is not encrypted. On the other hand, the detecting unit 106-1 detects the TS header, the PES header, the sequence header, the GOP header, and the sequence end code from the partially encrypted transport stream stored in the hard disk drive 102. Since the TS header, the PES header, the sequence header, the GOP header, and the sequence end code in the partially encrypted transport stream are not encrypted, the detecting unit 106-1 can detect the TS header, the PES header, the sequence header, the GOP header, and the sequence end code from the partially encrypted transport stream stored in the hard disk drive 102 in the same manner as the detecting unit 115. The editing unit 106 collects up only required TS packets out of the partially encrypted transport stream without decryption with reference to time codes included in GOPs detected by the detecting unit 106-1, generates a new partially encrypted transport stream, and writes the partially encrypted transport stream generated anew into the hard disk drive 102. Therefore, the partially encrypted transport streams are exchanged between the hard disk drive 102 and the editing unit 106, and thus no decrypted transport stream appears on the general bus 104, by which a copyright of the content can be protected.

Although the editing unit 106 performs editing with reference to time codes, it cannot interface with a user with only the time codes. Thus, the representative image generation unit 116 is provided. While the receiving unit 111 receives the transport stream, the MPEG decoder 114 restores video signals and time codes. The representative image generation unit 116 inputs the restored video signals and time codes from the MPEG decoder 114, generates representative images (for example, thumbnails of first frames of GOPs) for all or a part (for example, scene change portions) of the GOPs respectively from the restored video signals, and writes the representative images associated with the time codes into the hard disk drive 102. In editing, the editing unit 106 displays the representative images in a given method and collects up GOPs of the time codes of the selected range by using the representative images.

Otherwise, the process may be such that: after the partially encrypted transport stream is stored into the hard disk drive 102 once, the partially encrypted transport stream is read from the hard disk drive 102 and decrypted by the decrypting unit 113, and the MPEG decoder 114 restores the video signals and the time codes, the representative image generation unit 116 generates representative images, and the representative images associated with the time codes are written into the hard disk drive 102.

In addition, an encryption key may vary with the GOP when the encrypting unit 112 performs the encryption.

Specifically, an I-picture of the GOP is encrypted, while pictures other than the I-picture are not encrypted. An encryption key necessary for decrypting the I-picture is previously embedded in a form of an electronic watermark in the pictures other than the I-picture. In decryption, the electronic watermark is detected first from the pictures other than the I-picture, the encryption key is extracted from the detected electronic watermark, and the I-picture is decrypted using the encryption key. Unless the I-picture can be decrypted, the pictures other than the I-picture cannot be restored. Therefore, only the encryption of the I-picture provides the same effect as encrypting the entire GOP.

Otherwise, by previously writing a table where time codes of GOPs are associated with encryption keys necessary for decrypting the GOPs into a nonvolatile memory (not shown) of the digital broadcast processing board 103, the decryption may be carried out for each GOP by using the table at restoration.

The receiving unit 111, the encrypting unit 112, the decrypting unit 113, the MPEG decoder 114, the detecting unit 115, and the representative image generation unit 116 may be provided by means of hardware, or the CPU mounted on the digital broadcast processing board 103 may execute a program for causing the CPU to function as these parts. In addition, the editing unit 106 and the detecting unit 106-1 may be provided by means of hardware, or the CPU 101 may execute a program for causing the CPU to function as these parts.

While the transport stream is processed in the above description, a program stream may be processed on the basis of the same idea as for the above. More specifically, the program stream is encrypted except a pack header, a PES header, a sequence start code, a GOP header, and a sequence end code, and then the pack header, the PES header, the sequence start code, the GOP header, and the sequence end code are detected from the program stream, so that the program stream is edited in units of GOP without decryption.

The present invention can be applied to an edition of a content with a copyright of the content protected.

What is claimed is:

1. A transport stream encryption device, comprising:
   a general-purpose bus connecting the transport stream encryption device to a storage device;
   a detection unit for detecting headers including at least a TS header, and a PES header of a PES packet existing in a payload of a TS packet, a GOP header existing in a payload of a video PES packet from an input transport stream which is not encrypted;
   an encryption unit for encrypting a remaining part of the input transport stream except at least the headers which are detected and storing an encrypted transport stream, which includes the headers not being encrypted and the remaining part being encrypted, into the storage device through the general-purpose bus;
   a moving picture restoration unit for receiving the encrypted transport stream from the storage device through the general-purpose bus and for restoring a moving picture from the encrypted transport stream;
   a representative image generation unit for generating representative images corresponding to all or a part of GOPs respectively from the restored moving picture and storing the representative images to the storage device together with time codes which are related to the representative images; and
   a transport stream editing device, comprising:
   a detection unit for detecting the headers from the encrypted transport stream stored in the storage device; and
   an editing unit for editing the encrypted transport stream without decryption in such a way as to include a GOP selected by a user with reference to representative images in units of TS packets ranging from a TS packet where the GOP header is detected to a TS packet previous to a TS packet where a subsequent GOP header is detected out of TS packets having an identical PID.

2. The editing device according to claim 1 wherein said detection unit further detects a sequence header and a sequence end code existing in the payload of the video PES packet.

3. A transport stream encryption method, comprising the steps of:
   detecting headers at least a TS header, and a PES header of a PES packet existing in a payload of a TS packet, a GOP header existing in a payload of a video PES packet from an input transport stream which is not encrypted;
   encrypting a remaining part of the input transport stream except at least the headers which are detected and storing an encrypted transport stream, which includes the headers not being encrypted and the remaining part being encrypted, into a storage device through a general-purpose bus;
   receiving the encrypted transport stream from the storage device through the general-purpose bus;
   restoring a moving picture from the encrypted transport stream;
   generating representative images corresponding to all or a part of GOPs respectively from the restored moving picture and storing the representative images to the storage device together with time codes which are related to the representative images; and
   a transport stream editing device, comprising:
   a detection unit for detecting the headers from the encrypted transport stream stored in the storage device; and
   an editing unit for editing the encrypted transport stream without decryption in such a way as to include a GOP selected by a user with reference to representative images in units of TS packets ranging from a TS packet where the GOP header is detected to a TS packet previous to a TS packet where a subsequent GOP header is detected out of TS packets having an identical PID.

4. A transport stream editing method, comprising the steps of:
   detecting headers from an encrypted transport stream stored in a storage device; and
   editing the encrypted transport stream without decryption in such a way as to include a GOP selected by a user with reference to representative images generated from a restored moving picture in units of TS packets ranging from a TS packet where a GOP header is detected to a TS packet previous to a TS packet where a subsequent GOP header is detected out of TS packets having an identical PID.

5. The editing method according to claim 4, wherein, in said detecting step, a sequence header and a sequence end code existing in a payload of a video PES packet are further detected.

6. A non-transitory computer readable recording medium with a computer program recorded thereon and comprising code that upon execution cause a computer to perform a transport stream encryption method, said method comprising the steps of:
   detecting headers including at least a TS header, and a PES header of a PES packet existing in a payload of a TS packet, a GOP header existing in a payload of a video PES packet from an input transport stream which is not encrypted;

encrypting a remaining part of the input transport stream except at least the headers which are detected and storing an encrypted transport stream, which includes the headers not being encrypted and the remaining part being encrypted, into a storage device through a general-purpose bus;

receiving the encrypted transport stream from the storage device through the general-purpose bus;

restoring a moving picture from the encrypted transport stream; and generating representative images corresponding to all or a part of GOPs respectively from the restored moving picture and storing the representative images to the storage device together with time codes which are related to the representative images;

transport stream editing method, comprising the steps of:

detecting the headers from the encrypted transport stream stored in the storage device;

editing the encrypted transport stream without decryption in such a way as to include a GOP selected by a user with reference to representative images in units of TS packets ranging from a TS packet where the GOP header is detected to a TS packet previous to a TS packet where a subsequent GOP header is detected out of TS packets having an identical PID; and detecting the headers, a sequence header and a sequence end code existing in the payload of the video PES packet are further detected.

\* \* \* \* \*